3,044,177
METHOD OF AND APPARATUS FOR MAKING ORTHOGRAPHIC PROJECTIONS
Adolph T. Spalek, 17128 Chandler Park Drive, Detroit 21, Mich.
Filed Jan. 27, 1958, Ser. No. 711,406
10 Claims. (Cl. 33—189)

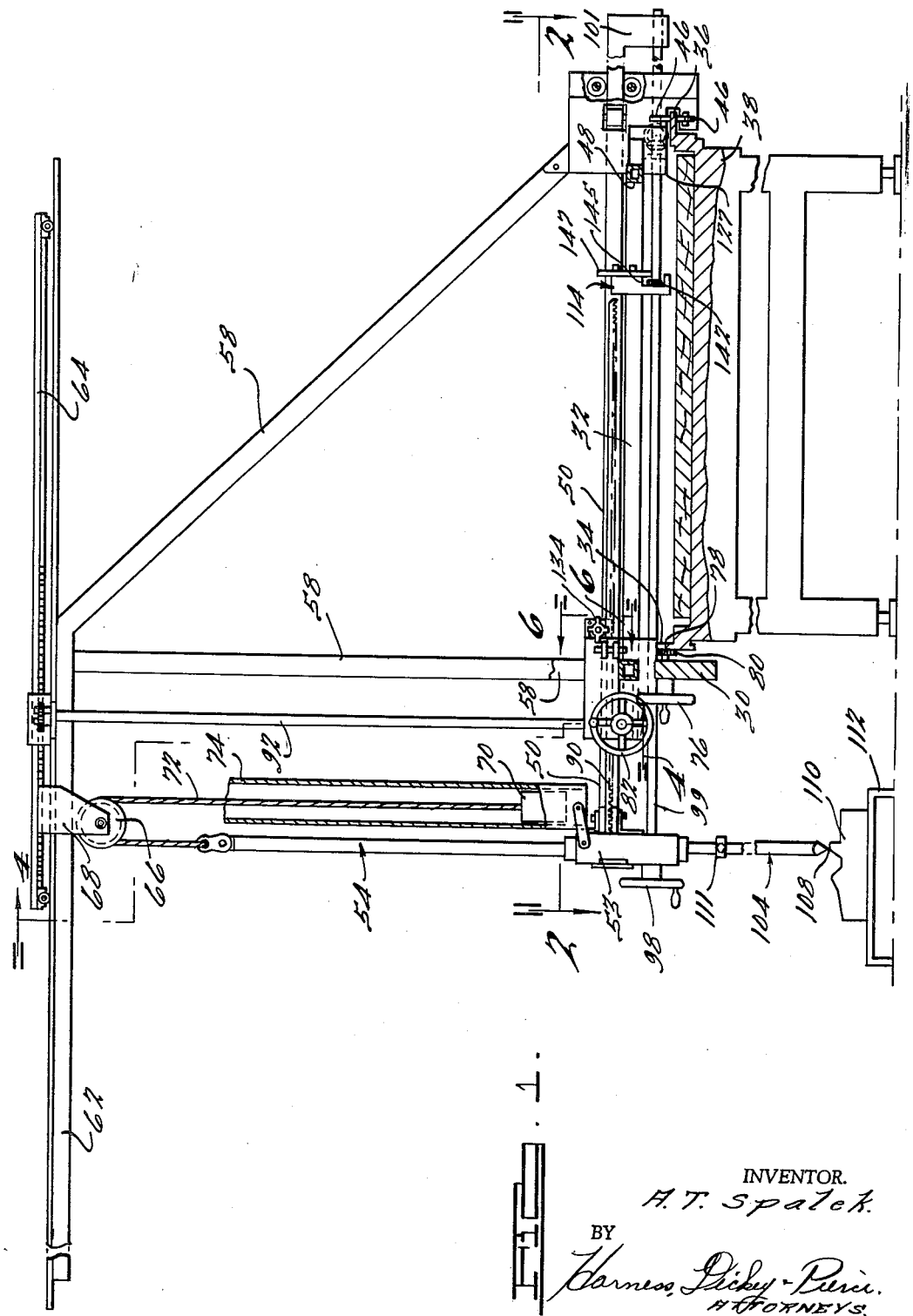

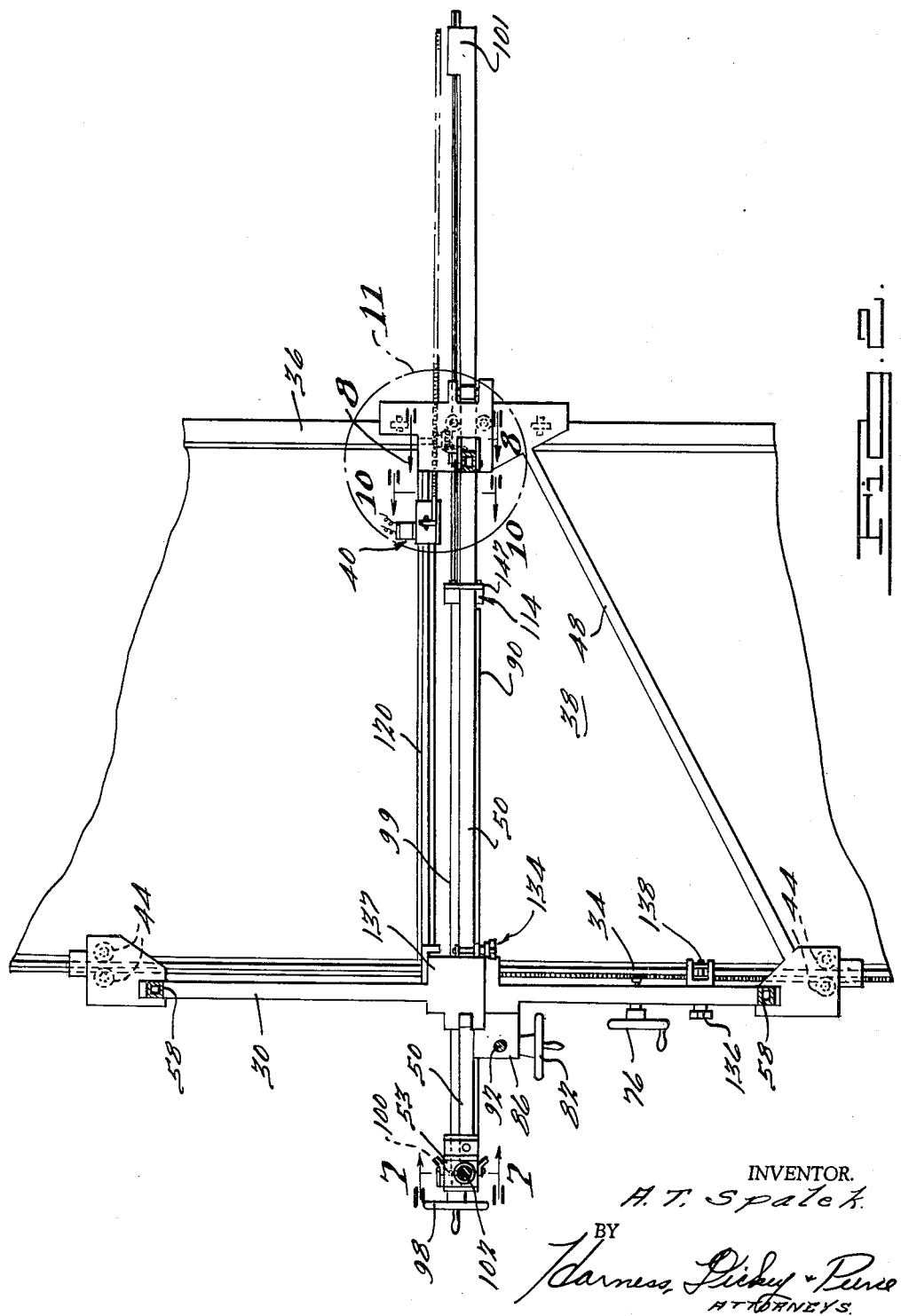

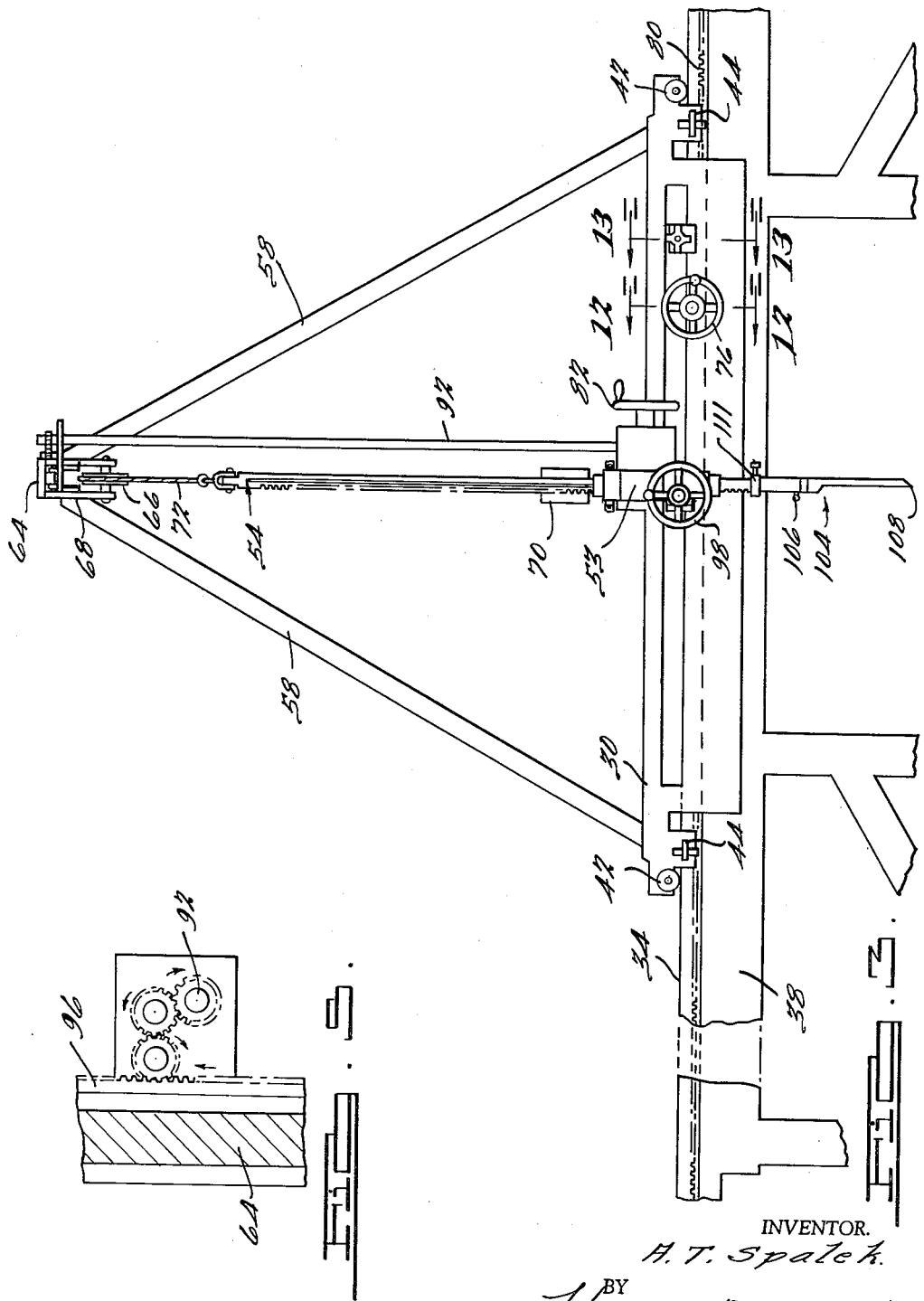

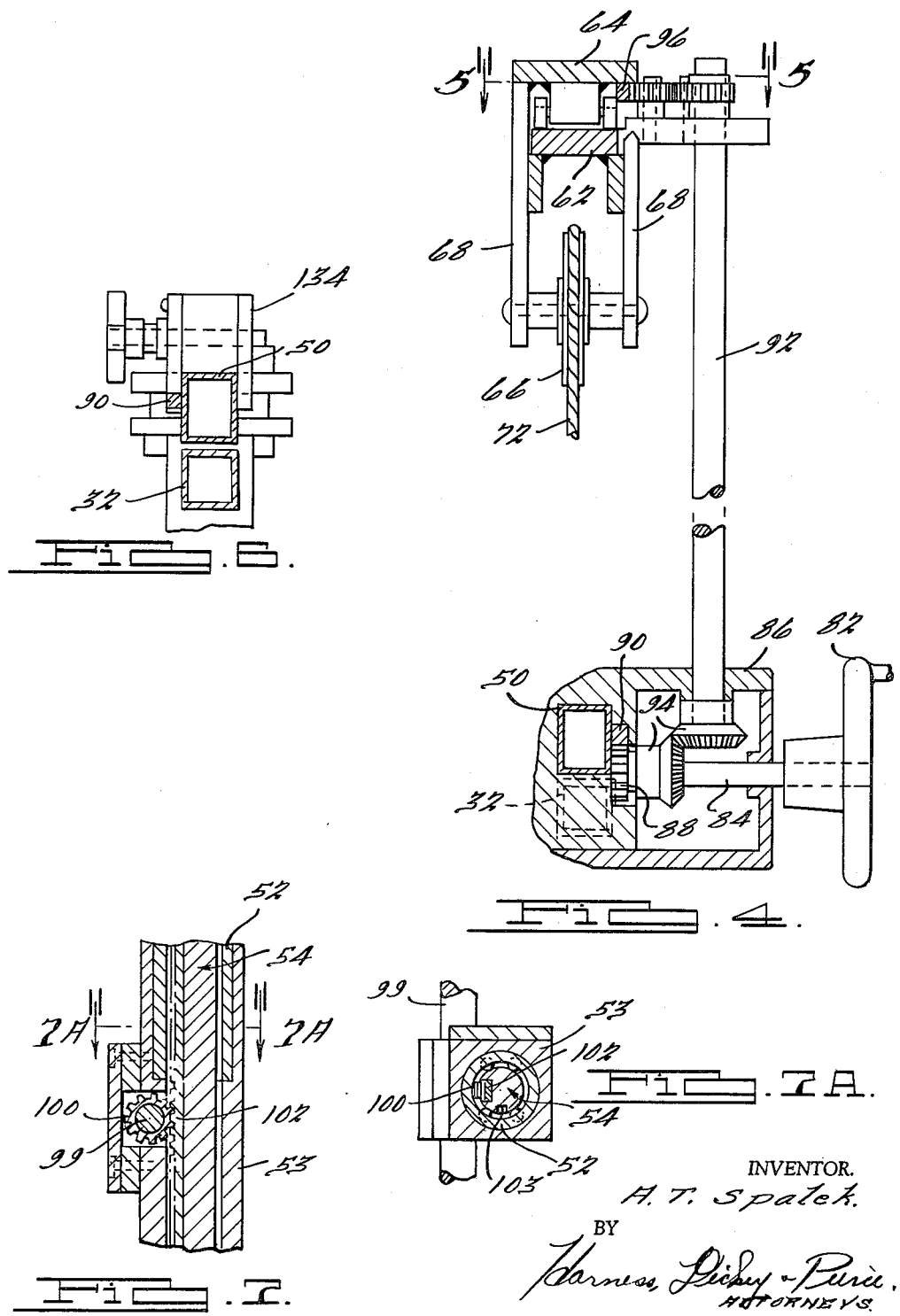

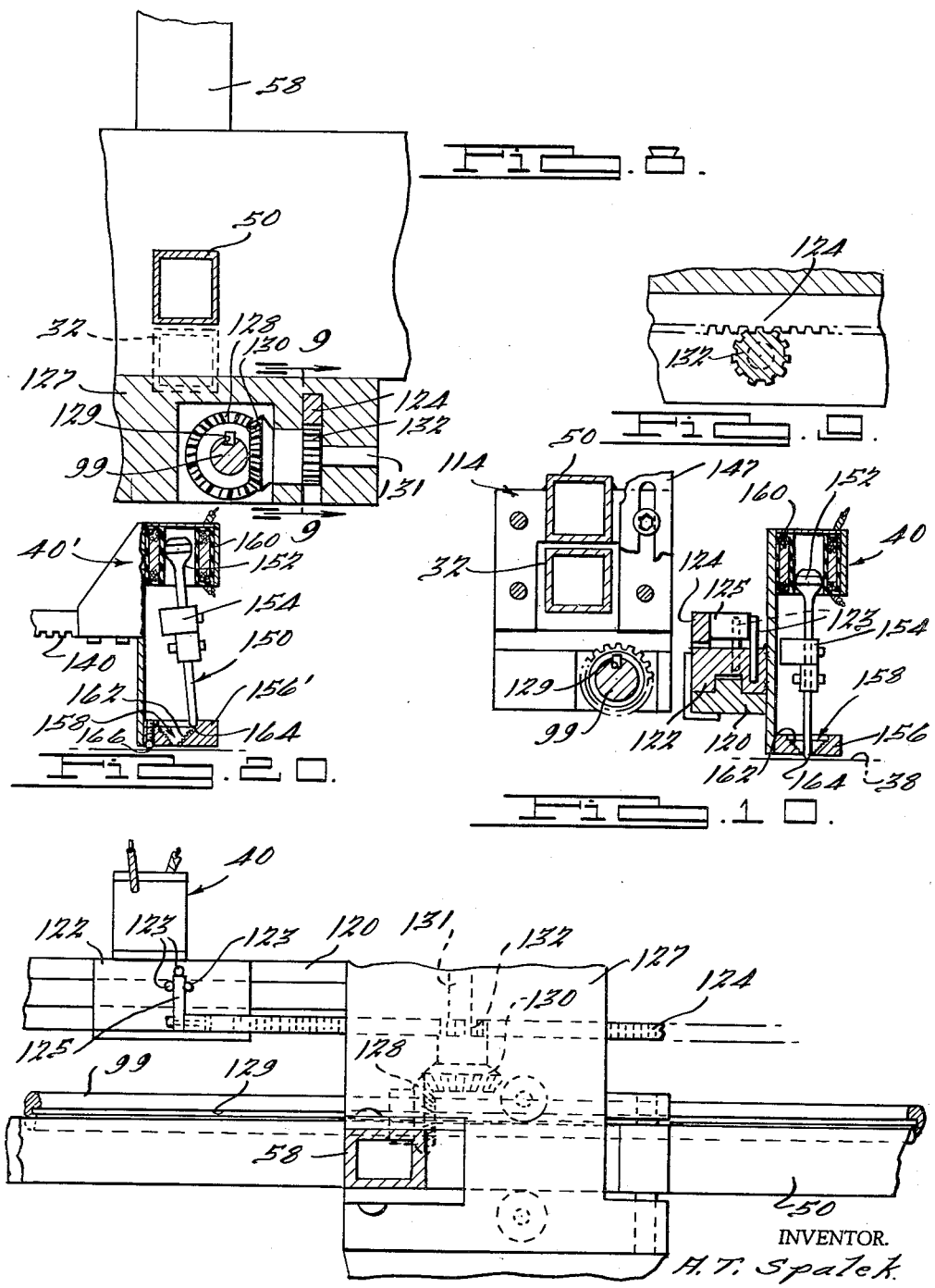

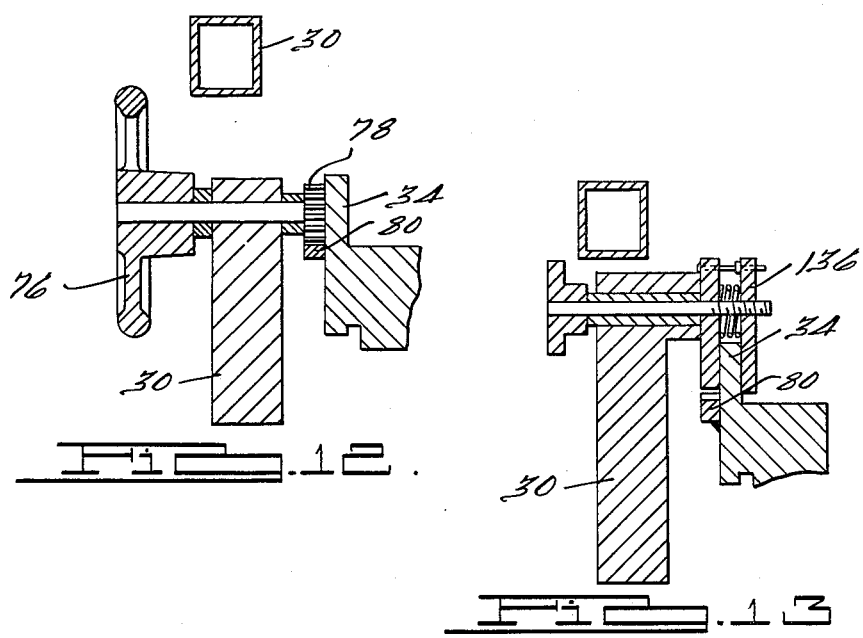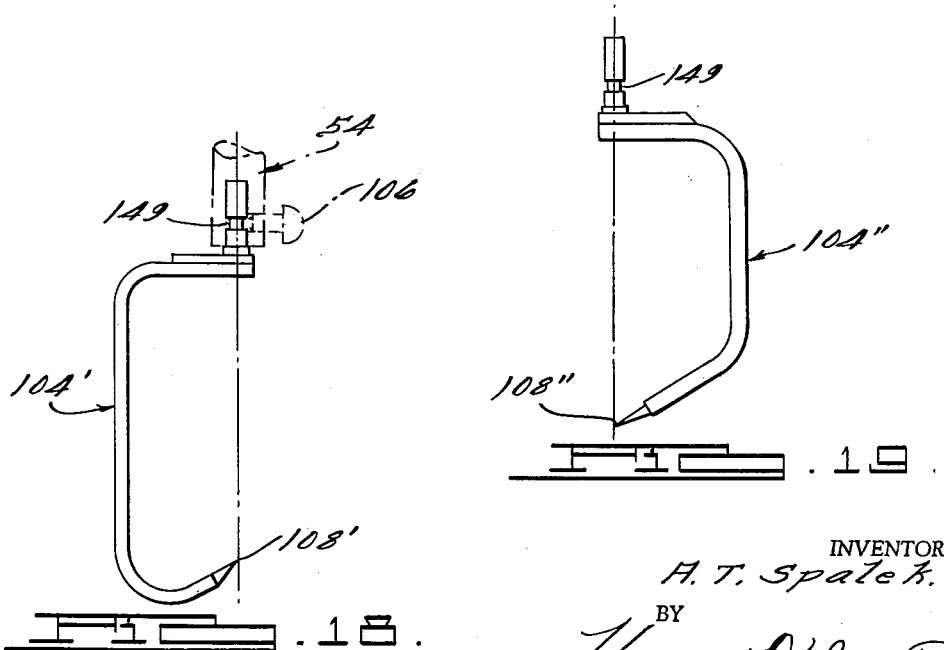

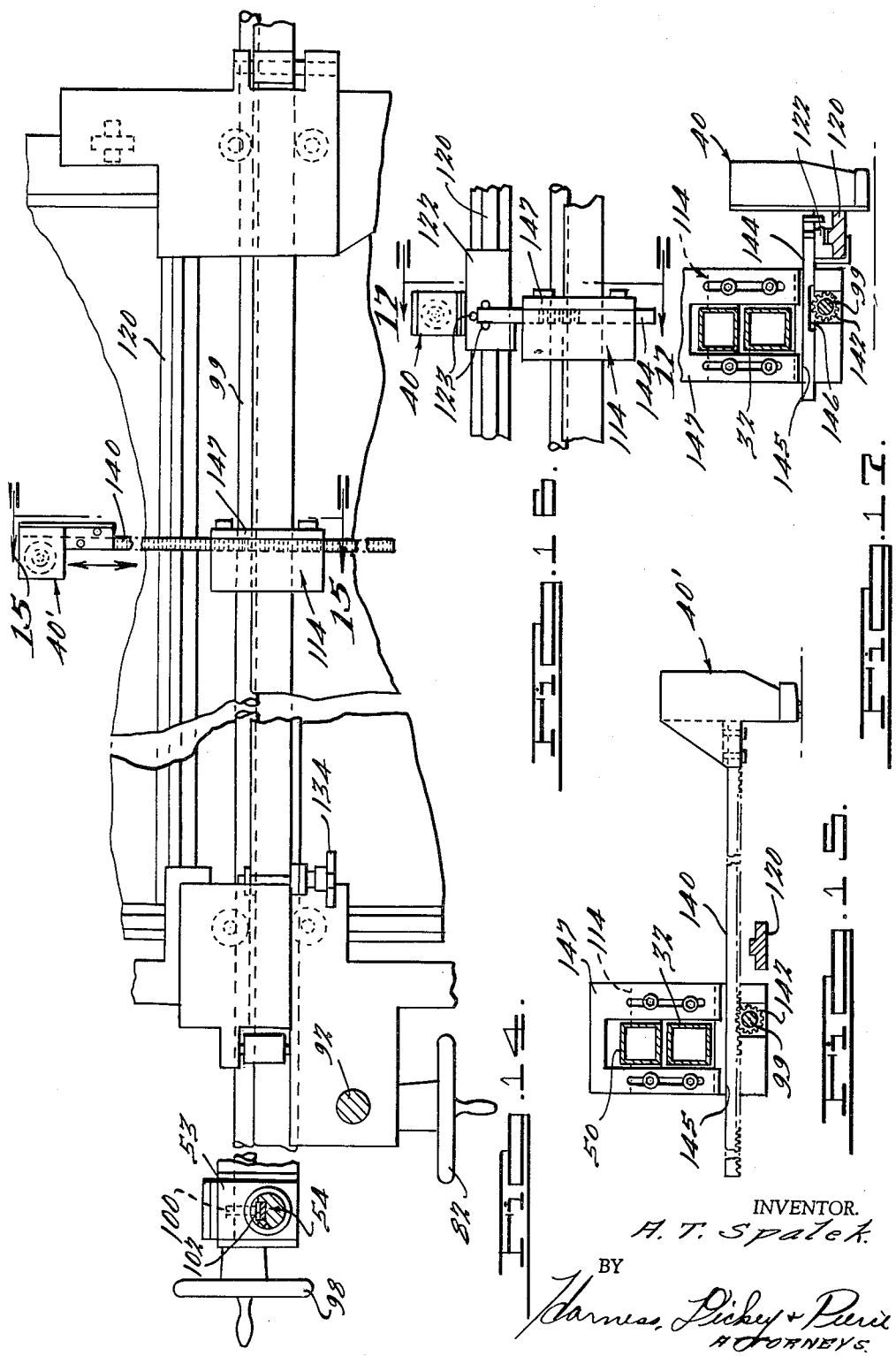

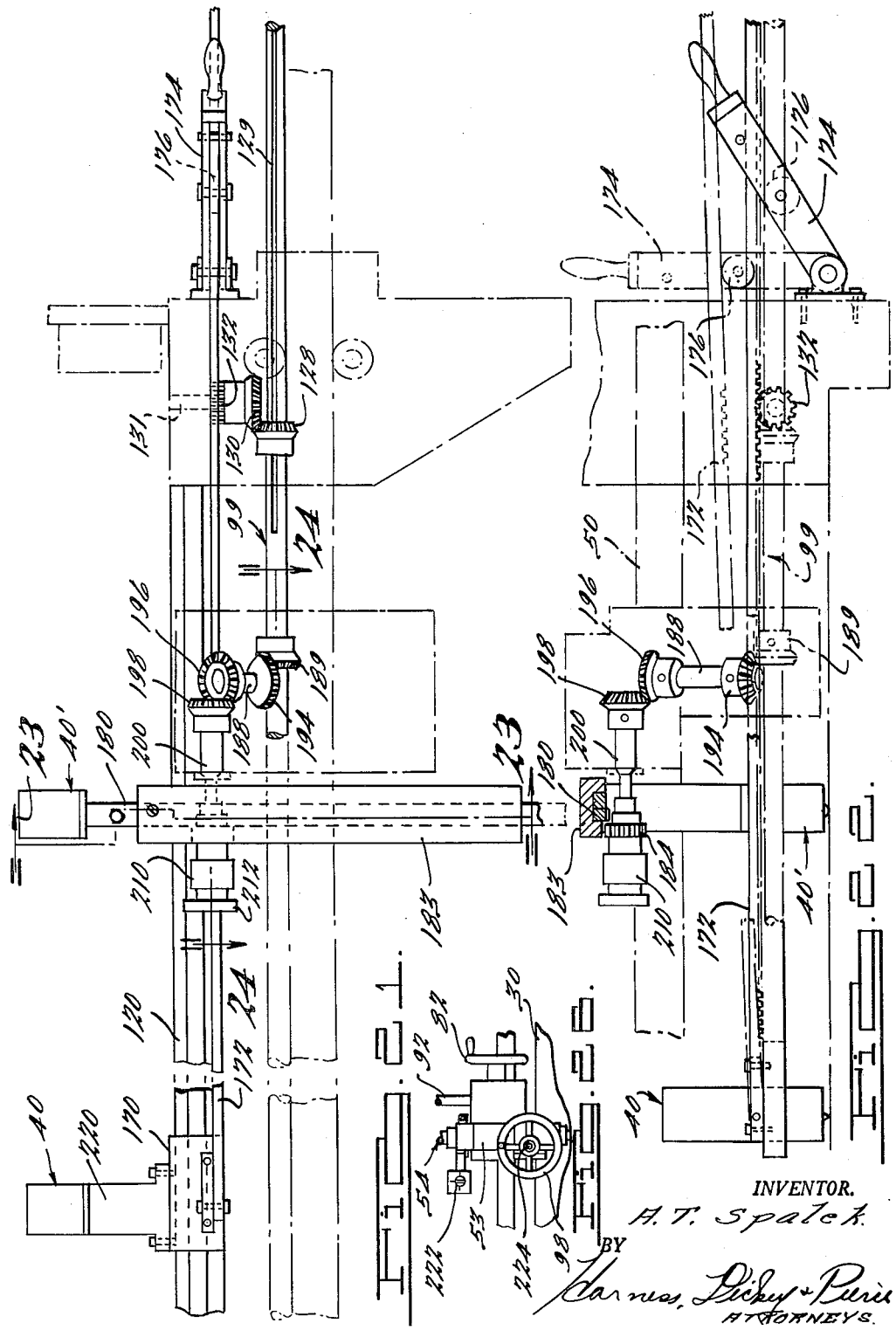

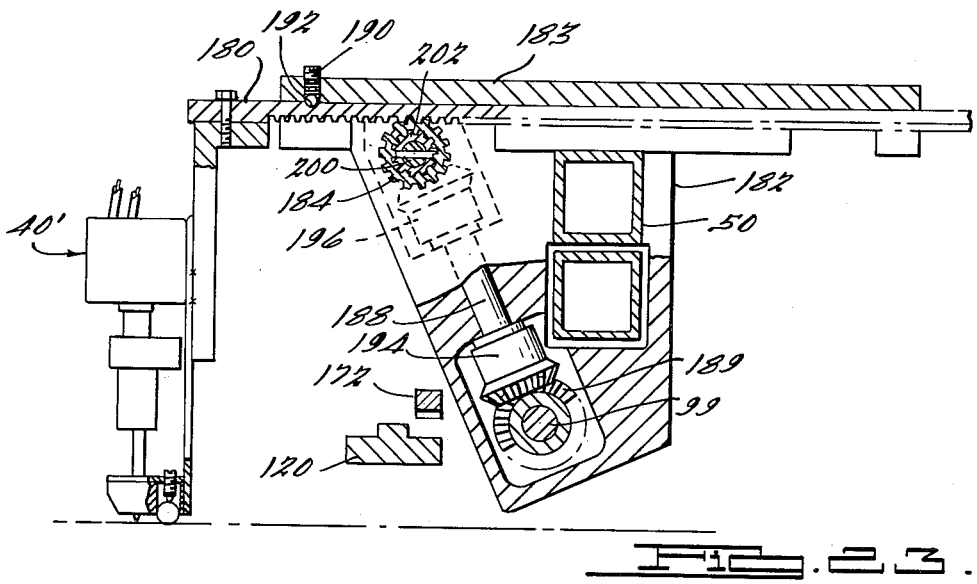
FIG. 23.
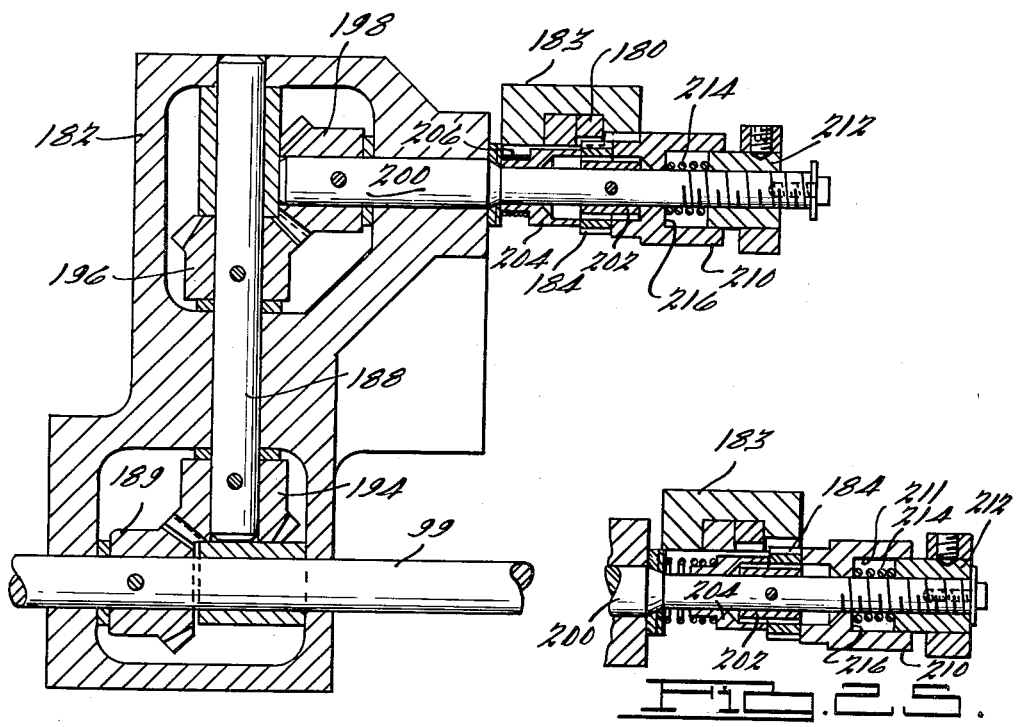
FIG. 24.
FIG. 25.
INVENTOR.
A. T. Spalek
BY
Harness, Dickey & Pierce
ATTORNEYS United States Patent Office 3,044,177
Patented July 17, 1962

This invention relates to an improved method of and apparatus for making orthographic projection drawings of shaped articles in elevation, plan, or section, as desired.

A great amount of highly skilled labor is currently employed in making full scale working drawings for the processing industries for use in the manufacture of dies and for numerous other purposes. This work as currently performed is time consuming, and requires a high degree of skill and painstaking care. A great deal of it involves the making of drawings directly from three dimensional models, in which work the draftsman is required to make accurate measurements of the models and to transfer the measurements with great care to the drawing surface. Also, much time is spent checking the shapes and dimensional accuracy of models to see whether they conform to the drawings from which they were made.

Accordingly, one important object of the present invention is to reduce the skill and time required to make orthographic projections of shaped articles.

Further objects of the invention are: to reduce the amount of time, effort and skill required to make accurate drawings directly from a three dimensional article, representing the article on a flat surface; to provide an improved method of and apparatus for making orthographic projections of improved accuracy directly from shaped articles and reducing the possibility of human error in such work; to provide an improved method of and apparatus for making orthographic projections in plan, elevation or section, as desired, directly from a three dimensionally shaped article and for comparing the dimensions of an article with those of a drawing representing it; to provide improved apparatus for simultaneously making both plan and elevational projections of shaped articles; and to provide an improved marking device for making visible point indications on a surface.

These and other objects are achieved by the present invention, according to which a pointer is moved successively into proximity with different selected points on the surface of a three-dimensionally shaped article, and a selected two dimensional component of the pointer travel is followed by a marking device. The improved apparatus of the invention in the embodiments illustrated herein comprises means for coordinating the movement of a marking instrument such as a pen or a scribe with a pointer in such a way that when the pointer is moved over the surface of a shaped article, the marking instrument is moved over a two dimensional path defining the desired projection of the article. The apparatus can be used for making plan, elevational, or sectional views as desired, and in its preferred form can be used for making both plan and elevational views simultaneously. The marking instrument may be actuated intermittently to produce a series of spaced dots, which may then be joined together by hand, using a French curve or the like, or, alternatively, the marking instrument may be kept constantly actuated to make a continuous line drawing. Means are also provided for coordinating all of the different projections by working, or datum lines.

The invention also provides means for making a series of dots on a surface with an ordinary, conventional ball point pen, thus avoiding the need for continually sharpening a pencil point, or the possibility of splotching of ink from a pen point. According to this feature, means are provided for rolling the ball of the ball point pen during its travel toward the surface to be marked, so that the contacting portion of the ball is coated with a fresh layer of ink just before it strikes the surface to be marked.

The invention will now be described in greater detail in connection with the accompanying drawings of which:

FIGURE 1 is a side elevational view, partly in section of an orthographic projection machine representing a first embodiment of the invention;

FIG. 2 is a plan view of the machine shown in FIG. 1;

FIG. 3 is a front elevational view of the machine as shown in FIGS. 1 and 2;

FIG. 4 is a longitudinal section of the machine as shown in FIG. 1, taken along the section line 4—4 thereof;

FIG. 5 is a horizontal section of the portion of the machine shown in FIG. 4, taken along the line 5—5 thereof;

FIG. 6 is a fragmentary thin longitudinal section of the machine as shown in FIG. 1, taken along the line 6—6 thereof;

FIG. 7 is a fragmentary thin longitudinal section of the machine as shown in FIG. 2, taken along the section line 7—7 thereof;

FIG. 7A is a cross-sectional view taken along the line 7A—7A of FIG. 7;

FIG. 8 is a fragmentary longitudinal section of the machine as shown in FIG. 2, taken along the line 8—8 thereof;

FIG. 9 is a fragmentary cross-sectional view of the portion of the machine shown in FIG. 8, taken along the line 9—9 thereof;

FIG. 10 is a longitudinal section of the machine as shown in FIG. 2, taken along the line 10—10 thereof, and particularly showing the marking device in its extended, or actuated position;

FIG. 11 is a fragmentary, plan view showing in greater detail that portion of the machine enclosed within the circle 11 of FIG. 2;

FIG. 12 is a cross-sectional view of the machine as shown in FIG. 3, taken along the section line 12—12 thereof;

FIG. 13 is a cross-sectional view of the machine as shown in FIG. 3, taken along the section line 13—13 thereof;

FIG. 14 is a fragmentary plan view of the machine illustrated in the preceding figures, being generally similar to the view of FIG. 11, but showing the machine as set up for making a different type of projection;

FIG. 15 is a cross-sectional view of the portion of the machine shown in FIG. 14, taken along the section line 15—15 thereof;

FIG. 16 is a fragmentary plan view, generally similar to the views of FIGS. 11 and 14, but showing the machine set up for making a third type of projection;

FIG. 17 is a cross-sectional view of the portion of the machine shown in FIG. 16, taken along the line 17—17 thereof;

FIG. 18 is a side elevational view of a modified form of a pointer for use in the machine shown in the other figures;

FIG. 19 is a side elevational view of a second modified form of a pointer;

FIG. 20 is a cross-sectional view of a marking device according to the invention, showing the device in its retracted position;

FIG. 21 is a fragmentary plan view of a machine representing a preferred embodiment of the invention, this machine being a modified form of the machine illustrated in the preceding figures;

FIG. 22 is a side elevational view of the machine portion shown in FIG. 21;

FIG. 23 is a longitudinal sectional view of the machine shown in FIG. 21, taken generally along the line 23—23 thereof;

FIG. 24 is a cross-sectional view of the machine shown in FIG. 21, taken generally along the line 24—24 thereof;

FIG. 25 is a fragmentary cross-sectional view generally similar to the view of FIG. 24, but showing an element of the machine in a different operative position; and FIG. 26 is a diagrammatic view showing the location of electrical control switches in the preferred embodiment of the invention.

An othographic projection drawing machine representing a first embodiment of the present invention is illustrated in FIGS. 1–20 and comprises a rigid horizontal T-frame including a longitudinal member 30 and a transverse member 32, mounted for smoothly guided sliding or rolling travel along a pair of spaced apart rails 34 and 36, which are mounted along opposite sides of a table 38, or other support for the material such as paper or cloth upon which a drawing is to be made. One or more marking devices such as the marking device 40 (FIG. 2) is associated with the transverse member 32 and is mounted for travel along the surface of the table 38.

As perhaps best shown in FIG. 3, the longitudinal frame member 30 is mounted for rigidly guided travel along the front rail 34, being supported thereon by vertical rollers 42 and being guided therealong by horizontal rollers 44, disposed at opposite ends of the member 30, so that it is at all times rigidly aligned with the rail 34. The free, or rear end of the transverse frame member 32 is provided with top and bottom rollers 46, which roll along the top and bottom of the rear rail 36. No lateral support is provided at the rear of the transverse frame member 32 against the rear rail 36, and thus binding or skewing of the frame due to possible misalignment between the two rails 34 and 36 is avoided. A diagonal brace 48 (FIG. 2) is also provided further to rigidify the structure.

A rigid superstructure is carried by the T-frame and includes three diagonal braces 58 which are attached to the T-frame at the ends thereof, and which provide a rigid support for a horizontal overhead rail 62. The rail 62 extends over the transverse frame member 32, and also projects forwardly beyond the longitudinal member 30.

A carriage 64 is roller mounted on the rail 62 for smoothly guided travel therealong, and supports a vertically movable, counterweighted vertical shaft 54. The shaft 54 and its counterweight 70 are attached to opposite ends of a flexible member such as the wire rope 72, which is trained over a pulley 66 pivoted between a pair of brackets 68 fixed to the carriage 64. The counterweight 70 is preferably enclosed within a housing 74, as indicated in FIG. 1, to restrain it against swinging in response to movement of the frame assembly.

A transverse slide 50 a little longer than twice the length of the transverse frame member 32 is roller mounted on the transverse frame member for smoothly guided travel therealong. A vertically oriented ball bushing 52 is fixed at the front end of the slide 50 within a housing 53, and the vertical shaft 54 is slidably received in this ball bushing 52 for smoothly guided vertical travel.

The entire frame assembly is drivable along the rails 34 and 36 by a rack and pinion arrangement including a handwheel 76 mounted for rotation with a pinion 78 on the longitudinal frame member 30. This pinion 78 meshes with a rack 80 (FIG. 3) fixed on the table 38 adjacent to the rail 34. The slide 50 is drivable along the transverse frame member 32 by means of a second handwheel 82 fixed on a shaft 84, which is journaled in a housing 86 mounted on the longitudinal frame member 30. A pinion 88 is fixed at the inner end of the shaft 84 (FIG. 4) and meshes with a rack 90 fixed upon the slide 50. The travel of the overhead carriage 64 is synchronized with the travel of the slide 50 by means of a torque rod 92, which is driven from the handwheel 82 through a pair of bevel gears 94, one of which is fixed upon the hand- wheel shaft 84, and the other one of which is fixed upon the torque rod 92. At its upper end, the torque rod is geared to a rack 96, which is secured to the carriage 64. The pulley 66 carried by the carriage 64 is thus maintained always in proper alignment with respect to the ball bushing 52 to keep the shaft 54 substantially vertical and aligned with the ball bushing at all times.

The shaft 54 may be driven vertically by a third handwheel 98 fixed on a rotatable drive shaft 99, which is mounted parallel to the slide 50, and which is journaled at the front in the ball nut housing 53 and at the rear in a bracket 101 fixed to the rear of the slide 50. A pinion 100 is fixed to the drive shaft 99 and meshes with a rack 102 secured to the vertical shaft 54. In order to avoid interference with the ball bushing 52, and to permit use of a ball bushing of conventional type, the rack 102 is preferably recessed in a longitudinal groove (not separately designated) in the shaft 54. The shaft 54 is also provided with a separate keyway 103 which receives a key (not shown) fixed with respect to the housing 53 for holding the shaft against rotation.

The arrangement provides for rigidly guided, smooth vertical travel of the shaft 54, and assures positive and accurate synchronization of the rotation of the drive shaft 99 with vertical movement of the vertical shaft 54, without any significant backlash or tendency toward binding. The position of the shaft 54 in the horizontal plane is also accurately maintained with respect to the slide 50.

The weight of the shaft 54 is carried by the overhead rail 62 in order to avoid imposing a bending stress on the slide 50, and thus to assure that the vertical movement of the shaft 54 is accurately correlated with rotation of the drive shaft 99. In the arrangement of the illustrated embodiment, bending of the slide 50 is reduced to a negligible factor, and causes substantially no vertical movement of the shaft 54.

A pointer 104 is swiveled at the lower end of the shaft 54 beneath the ball bushing 52 for rotation about the vertical axis of the shaft 54. The upper end of this pointer 104 is shaped to fit within a socket (not shown) in the bottom of the shaft 54, and is removably retained therein by means of a thumb screw 106. The bottom of the pointer 104 is tapered, coming to a definite point 108, which is aligned on the swivel axis and which, during operation of the machine, is traversed over the surface of a workpiece such as the model 110 shown in FIG. 1 from which a projection is to be made. Alignment of the point 108 on the swivel axis permits rotation of the pointer without changing the location of the point, and allows the point to enter relatively sharp corners.

Further features of the construction of the apparatus will be described in connection with the following description of the operation thereof, taken first with respect to making plan views of an article, including contour lines.

*Operation To Make a Plan View of an Article*

In operation, to make a plan view of an article such as the model 110, the article is arranged on a tilting table 112 or any other desired support at a desired attitude, and is positioned beneath the pointer 104 so that all parts that are to be drawn are within reach of the point 108. A marking device generally similar to the device 40 illustrated in FIG. 2 is mounted for travel with the slide 50. The construction of the marking device 40 will be described in greater detail hereinafter, but for present purposes it is sufficient that the device include an instrument, which may be actuated or retracted, and which when it is actuated is effective to make a mark upon the paper or other drawing surface supported on the table 38. The marking device 40 is rigidly but removably fixed to a bracket 114 which is fixed to the slide 50 for travel therewith between the rails 34 and 36.

The point 108 is then traversed over the desired contour of the article 110, stopping at different points therealong, and the marking device 40 is actuated each time the point 108 contacts a newly selected point on the article. Generally, because of the difficulty of moving the point 108 smoothly along a selected line on the article 110, it is preferred to mark selected points, actuating the marking device 40 intermittently to make an impression on the drawing surface each time the point 108 is brought into contact with the surface of the article at a new point thereon.

The marking device 40 in this arrangement of the machine is fixed with respect to the slide 50, and follows the horizontal travel of the pointer 104 and is not affected by the vertical travel thereof. The action is somewhat similar to a pantograph except that the pointer 104 is free to move vertically without affecting the position or operation of the marking device 40. By bringing the point 108 to successive positions along the periphery and along the contour lines of the article 110, and actuating the marking device 40 when the point 108 is so positioned, a complete plan view may be readily and quickly made, the view being represented by a series of successive dots on the paper, which may then be connected together by the draftsman, using a ruler, French curve or the like in the conventional manner.

The arrangement of the machine is such that plan, elevational, and sectional views of an article may all be made on a single sheet of paper, and when this is done all the views are ordinarily automatically correlated with each other. When, however, different views are to be drawn on different pieces of paper, it is usually desirable to provide working, or datum lines by which the different views may be accurately related one to the other.

Such lines may be readily drawn by the machine of the present invention. To establish a height reference, the point 108 is first moved to a reference level, such as the level of the highest point on the article 110, and is locked against travel above this level by moving a slip collar 111 on the shaft 54 up against the housing 53 and tightening it on the shaft in that position. This establishes a height reference, and the collar 111 is maintained in its locked position during the making of all other related projections.

For longitudinal and transverse working lines, the point 108 is moved to a selected reference point on the model, and is then traversed along the desired coordinate from the reference point while the marking device 40 is kept continuously actuated. The mechanical arrangement by which the working lines of one view such as a plan view are positively correlated with the working lines of another view such as an elevational view will be readily understood from the following description of the arrangement for making elevational and sectional views.

*Operation for Making Elevational Views of an Article*

For making an elevational view of an article, the marking device 40 is arranged as shown in FIGS. 2 and 8–11 to travel over the surface of the table 38 responsively to the vertical and longitudinal travel of the pointer 104, and to be unaffected by the transverse travel thereof. When the pointer 104 moves vertically, the marking device 40 moves transversely, riding along a key gib 120, which is mounted on the T-frame parallel and adjacent to the transverse frame member 32. The marking device 40 in this arrangement is fixed to a slide carriage 122, which is mounted on the gib 120 for smoothly guided travel thereon, and which carries three upwardly projecting pins 123. A lateral arm 125 fixed at one end of a rack 124 fits between two of these pins 123 to drive the marking device along the gib. The rack 124 is driven responsively to rotation of the drive shaft 99 through a gear assembly mounted in a housing 127 which is fixed to the transverse frame member 32 at the rear of the machine. A first bevel gear 128 is journaled in the housing 127 and keyed on the shaft 99 for rotation therewith. The bevel gear 128 meshes with a second bevel gear 130, which is fixed on an auxiliary shaft 131 journaled in the housing. The rack 124 meshes with a pinion 132 which is fixed on the auxiliary shaft 131, and so is geared to be driven by the drive shaft 99 through the bevel gear pair 128 and 130.

The marking device 40 is thus coupled through the drive shaft 99 to the vertical shaft 54, upon which the pointer 104 is mounted for transverse travel synchronously with vertical travel of the pointer. When the pointer 104 moves vertically, the drive shaft 99, being geared to the rack 102 on the vertical shaft, is rotated, and drives the bevel gears 128 and 130 to drive the rack 124, which is secured to the carriage 122. The keyway 129 on the drive shaft 99 is sufficiently long to permit full travel of the drive shaft with the slide 50 without obstruction by the bevel gear 128. With this arrangement, transverse travel of the pointer 104 does not affect the marking device 40.

The gearing is on a one-to-one ratio throughout, that is, the pinion 100 which engages the vertical shaft rack 102 is of the same size as the pinion 132 engaging the marking device rack 124, so that for every unit of vertical travel of the pointer 104 there is one unit of horizontal transverse travel of the marking device 40.

With the apparatus arranged in this way, an elevational view is made by moving the point 108 over the model 110, stopping at preselected points thereon to actuate the marking device 40 to make dots on the surface of the table, which dots may then be joined to make a continuous line drawing showing the article in elevation.

This same arrangement is used for making longitudinal sections of the model 110, except that the slide 50 is locked in position so that the pointer 104 is free to move only in a single longitudinal plane, as selected for the desired section. For this purpose, a screw actuated clamp 134 is fixed with respect to the transverse frame member 32 is tightened upon the slide 50, fixing the slide 50 against transverse travel. The pointer 104 is then movable vertically and longitudinally with respect to the table and is locked against transverse travel so that it always remains in the selected vertical longitudinal plane. Since the marking device 40 is now arranged to move responsively to longitudinal and vertical travel of the pointer 104, a longitudinal sectional projection may be made readily and accurately simply by moving the point 108 along the surface of the model 110 contacting selected points in the preselected vertical plane.

*Operation of the Machine for Making Cross-Sectional Views of an Article*

When it is desired to make a cross-sectional view of the article, the marking device 40 must move over the surface of the table 38 responsively to the transverse movement of the pointer 104 and also to its vertical movement, and the pointer 104 must be locked for travel in a single vertical transverse plane, that is, it must be locked against longitudinal travel. Locking against longitudinal travel is accomplished by tightening a clamping device 136 (FIG. 13) mounted on the longitudinal frame member 30. This clamping device 136 engages the front rail 34 and locks the longitudinal frame member 30 thereto when it is tightened, holding the frame against longitudinal travel.

As perhaps best shown in FIGS. 14 and 15, for making a cross-sectional view, a modified marking device 40' is fixed at one end of a rack 140, which is positioned longitudinally with respect to the table 38, and which extends across the transverse frame member 32, being slidably fitted through the bracket 114. The rack 140 meshes with a pinion 142 fixed upon the drive shaft 99, and is driven thereby to move the marking device 40' longitudinally along the table 38 in response to vertical travel of the follower point 108. Since the bracket 114 is fixed to the slide 50, the rack 140 carries the marking device 40' transversely across the table with the slide as the pointer 104 is moved transversely.

A cross-sectional drawing is then made by moving the point 108 over the surface of the model 110 stopping at selected points thereon, all of which are located in the same vertical transverse plane to actuate the marking device 40'.

Mounting Means for the Marking Devices

The marking device 40 is used for making both plan and elevatioal views. It is fixed upon and is carried by the slide carriage 122. When an elevational view is to be made, the carriage 122 is engaged and driven by the rack 124 as hereinabove explained. When a plan view is to be made, the rack 124 is removed and the carriage 122 is moved along the gib 120 into position adjacent to the bracket 114, which is fixed on the slide 50. The carriage 122 is then fixed to the bracket 114 by means of a notched bar 144 which extends through the bracket 114 fitting in the same guideway 145 therein immediately above the pinion 142, in which the cross-section rack 140 is received. One end of the bar 144 fits between the pins 123 of the carriage to hold the carriage against movement relative to the slide 50. The notch 146 in the bar 144 provides clearance for the pinion 142, permitting it to rotate freely.

The rack 140 to which the cross-sectional marking device 40' is attached fits within the same guideway 145 in the bracket 114, and is held in engagement with the pinion 142. For ease in conversion from one type of projection to another, the guideway 145 is preferably formed as a slot in the bracket 114, and a retaining, or cover plate 147 is slidably mounted on the bracket in position to slide over the slot, thereby to close it and to complete the guideway.

Specifically shaped pointers such as the gooseneck pointers 104' and 104'' shown in FIGS. 18 and 19 may be used in place of the straight pointer 104 shown in FIGS. 1 and 3 for reaching back drafts or reversely curved portions of the model 110. The pointers 104' and 104'' may be shaped as desired to reach any portion of the model no matter how complex its curvature. The pointers 104, 104', and 104'' may be interchanged during the course of work without affecting the operation of the machine if they are made so that their points 108, 108', and 108'' all lie on the axis about which the pointers rotate when they are mounted on the shaft 54, and are equally spaced from the shoulders 149 which are engaged by the retaining screw 106 in the shaft 54.

The Ball Point Marking Devices

During the development of the present invention, it was found that a pencil did not make a truly satisfactory marking instrument since it required periodic sharpening at relatively short intervals. Also, trouble was encountered with pens using liquid ink, which tended to form splotches occasionally, and to be bothersome and generally messy to service. Although a conventional ball point pen avoids the splotching and messiness of the liquid ink pens, and does not require frequent attention, it had heretofore been considered impracticable for making a series of dots, since in order to make a mark, the ball had first to be rotated to expose a freshly inked surface. In general, a ball point pen is satisfactory for making lines and for writing, but after the pen has been idle for a time the first portion of a stroke made with it does not make a visible mark, but serves merely to rotate the ball to bring a freshly inked surface thereof into contact with the writing paper. If a ball point pen is held above a surface and repeatedly dropped thereon, it will at best make dot impressions on the first few drops if the exposed surface of the ball happens to have been freshly coated with ink. But after making a few dots all of the ink is transferred from the exposed ball surface, and no further marks can be made until after the ball has again been rolled in its socket to expose a new, freshly ink-coated surface. According to the present invention, the marking devices 40 and 40' include conventional ball point pen cartridges 150, which are mounted for vertical reciprocation toward and away from the surface to be marked, and means are provided for rolling the ball 164 of the cartridge as it falls toward the surface to be marked. A freshly ink-coated portion of the ball surface is brought into contact with the paper each time the pen falls thereupon.

This is accomplished in the illustrated apparatus (see FIGS. 10 and 20) by mounting the ball point cartridge 150 upon a solenoid plunger 152, which, during operation, normally holds the cartridge 150 in its retracted position, that is, drawn up away from the surface to be marked. The plunger 152 is rounded at its upper end, and is shaped so that when it is drawn upwardly into the solenoid 160 it can tilt, yet when it is vertical it fits the solenoid relatively closely with very little side play. A weight 154 is loosely mounted in an eccentric position on the plunger, and urges the plunger 152, together with the cartridge 150 toward an inclined position. The weight 154 also provides a uniform impelling force for driving the plunger 152 and the cartridge 150 downwardly when the solenoid 160 is de-energized.

The ball end of the cartridge 150 fits within the bore 158 of a base member 156 mounted below the solenoid 160 and positioned slightly above the table 38. The upper portion of the bore 156 is relatively large to permit the cartridge 150 to tilt when it is retracted. The lower end of the bore 158 is relatively small to guide the cartridge 150 accuately when it falls upon the surface to be marked. The intermediate portion 162 of the bore is tapered, and is corrugated, or slightly roughened.

The ball end of the cartridge 150 rests against the wall of the upper portion of the bore 158 when the solenoid is energized, being urged thereagainst by the off-center weight 154. When the solenoid 160 is de-energized, the weight 154 drives the cartridge 150 downwardly in the bore 158 and the cartridge ball 164 strikes and rolls upon the tapered portion 162 of the bore. This rolling of the ball 164 during its downward travel exposes a freshly inked surface portion which immediately thereafter strikes the surface to be marked.

The marking devices 40 and 40' are identical in construction except for the provision of a ball caster 166 on the cross section marking device 40'. The ball caster 166 is mounted in the base 156' of the marking device 40' and supports the base slightly above the drawing surface, permitting the marking device to roll freely thereover with minimum resistance. The ball caster is desired on the cross section marking device 40' in order to avoid loading the rack 140, and to permit the rack 140 to be of relatively light construction.

Machine With Permanently Mounted Marking Devices

The presently preferred embodiment of the invention is illustrated in FIGS. 21 to 25, and differs from the machine hereinabove described only in the arrangement for mounting and driving the two marking devices 40 and 40'. In all other respects the preferred machine is identical with the machine shown in FIGS. 1 to 20. In the preferred machine the marking devices 40 and 40' are permanently mounted, and there is no need for removing and replacing parts when changing from one type of projection drawing to another.

With the preferred machine, as illustrated in FIGS. 20 to 25, plan and elevational views of an article may be made simultaneously, and the making of such views may be interrupted at any time without inconvenience to make a vertical sectional view. In the preferred machine, the marking device 40 is mounted on and supported by a carriage 170 which is slidably mounted on the gib 120. A rack 172 is pivoted at one end on the carriage 170 and extends rearwardly to the rear of the machine where it normally lies upon the pinion 132 in mesh therewith. The driving connection is generally similar to the connection in the machine shown in FIGS. 1–20, except that rack 172 is permanently connected to the carriage 170, and is releasable from engagement with the pinion 132. In both cases, during operation the marking device 40 is driven transversely synchronously with the vertical travel of the pointer 104.

The rack 172 may be disengaged from the pinion 132 to disconnect the marking device 40, as may be desired, for example, in order to adjust its position on the gib 120. This is accomplished by means of a lever 174 pivoted at the rear of the T-frame. The lever 174 carries a roller 176 which is positioned directly beneath the rack 172 and normally lies out of engagement therewith. When the lever 174 is swung upwardly, it carries the roller 176 upwardly into engagement with the rack 172, raising the rack out of engagement with the pinion 132. The lever 174 may be swung to an over-center position as illustrated in dashed lines in FIG. 21 to hold the rack out of engagement with the pinion 132.

The second marking device 40′ is fixed at one end of a rack 180 which, as perhaps best shown in FIGS. 23 to 25, is slidably mounted in a guideway 183 fixed upon the slide 50. The rack 180 extends across the slide 50, that is, longitudinally along the table 38, and is positioned to be engaged by a pinion 184 which is geared to the drive shaft 99. When the pinion 184 is in mesh with the rack 180, the marking device 40′ is driven longitudinally along the table responsively to the vertical travel of the pointer 104. This arrangement is used for making cross-sectional drawings.

A ball detent 190 is mounted in fixed position upon the guideway 183 and spring urged into light pressure engagement with the rack 180. The ball detent 190 falls into a shallow recess 192 in the rack 180 when the rack is substantially fully retracted, that is, when the marking device 40′ is moved near its limit position toward the slide 50. This detent 190 holds the marking device 40′ in its retracted position when the pinion 184 is disengaged from the rack 180, so that the marking device then travels with the slide 50, as is desired when making plan and contour views.

The longitudinal drive for the rack 180 is taken from the drive shaft 99 through a canted shaft 188 which is journaled in a bracket 182 fixed upon the slide 50. A pair of bevel gears 194 and 196 are fixed on this shaft 188. The lower gear 194 meshes with a bevel gear 189 fixed on the drive shaft 99, and the upper gear 196 meshes with a bevel gear 198 fixed at one end of an auxiliary shaft 200, which is journaled in the bracket 182 and which projects therefrom under the rack 180.

The auxiliary shaft 200 is thus drivingly geared to the drive shaft 99 and rotates synchronously therewith. The shaft 200 extends forwardly from the bracket 182 and crosses beneath the guideway 183 and the rack 180. The pinion 184 is slidably keyed to a bushing 202 which is fixed on the shaft 200 for rotation therewith. A cup-like member 204 is fitted on the shaft 200 between the bracket 182 and the pinion 184. This cup-like member 204 is slidable on the shaft 200, and its outer end is enlarged to enable it to fit over and to receive the bushing 202. The member 204 is urged outwardly toward the bushing 202 and into abutting engagement with the pinion 184 by a biasing spring 206 seated between the bracket 182 and the member 204. The spring 206 resiliently urges the pinion 184 in an outward direction and out of engagement with the rack 180.

Another member 210 is slidably mounted on the shaft 200 outwardly from the pinion 184 for urging the pinion 184 into engagement with the rack 180. The inwardly facing bore of this member 210 is of a size to receive the bushing 202, and its outwardly facing bore 211 is of a size to receive a driving nut 212, which is threadedly fitted on the end of the shaft 200. A biasing spring 214 is fitted within the bore 211 between an annular flange 216 in the member 210 and the inner face of the nut 212. When the nut 212 is retracted, that is, when it is turned outwardly to its extreme limit on the shaft 200, it relieves the second biasing spring 214, and permits the first biasing spring 206 to drive the pinion 184 out of mesh with the rack 180. When the nut 212 is turned inwardly on the shaft 200, it compresses the second biasing spring 214, urging the member 210 inwardly, and thus driving the pinion 184 into engagement with the rack 180. This action also compresses the first biasing spring 206.

When it is desired to make a plan or contour drawing, the rack 180 is fully retracted to the position shown in FIG. 23 where the ball detent 190 is engaged within the recess 192, and the driving nut 212 is retracted, that is, unscrewed to its extreme limit on the shaft 200. This releases the pinion 184 from engagement with the rack 180, and sets the ball detent 190 to hold the marking device 40′ in fixed position relative to the slide 50. The marking device 40′ now follows only the horizontal movement of the pointer 104, travelling with the slide 50, and being unaffected by the vertical travel of the pointer.

When it is desired to make a cross-sectional view, it is merely necessary to re-engage the pinion 184 with the rack 180 by turning the driving nut 212 inwardly upon the shaft 200. When making a cross-sectional drawing, it is also preferable, as explained hereinabove, to lock the T-frame against longitudinal travel along the table 38.

In order to properly correlate the various different projections of an article without the necessity of making working lines, the marking device 40 used for making elevational views and longitudinal sections, and the plan marking device 40′ are spaced equally from the slide 50, that is, when the marking device 40′ is fully retracted for making a plan view, it is positioned to mark along the same transverse line as the elevation marking device 40. With this arrangement, the different views, plan, elevation and section are all properly correlated without the necessity of actually laying out working lines, and the dimensions of the machine may readily be made to accommodate most of the drawings to be made.

In some cases, however, when a relatively large model is to be projected or one of relatively great height, the elevation marking device 40 may interfere with the plan marking device 40′. To take care of such cases, the gib 120 is spaced relatively closely to the slide 50, and the elevation marking device 40 is normally mounted on a removable spacer block 220, which is secured to the carriage 170. The spacer block 220 may readily be removed and the marking device 40 attached directly to the carriage 170, and in this position the marking device 40 is offset from the plan marking device 40′, and is free to pass beneath the rack 180 and between the gib 120 and the plan marking device 40′. With this arrangement, the marking devices 40 and 40′ can pass each other freely, and the machine is adapted for making drawings of maximum size. With this arrangement, of course, it is preferable to make working lines in order properly to correlate the various different views.

The views made by the different marking devices 40 and 40′, respectively, may be made conveniently and readily identifiable by the use of differently colored inks in the respective marking devices to eliminate the likelihood of confusion when the dots marked on the machine are later connected by hand to make a line drawing.

The solenoids 160 of the two marking devices 40 and 40′ may be connected to an electric power source through a suitable selector switch 222 which as illustrated in FIG. 26 may conveniently be mounted upon the T-frame in any convenient location, preferably closely adjacent to the handwheels. In one of its positions, the switch 222 connects both of the marking devices for actuation by an actuating push button type switch 224, which may conveniently be mounted upon the vertical drive wheel 98 much in the manner of the old-fashioned automobile horn button. In another position, the selector switch 222 connects only one of the two marking devices 40 and 40′ for actuation by the push button 224, and in its third position the selector switch connects only the other one of the two marking devices 40 and 40′ for actuation.

In the illustrated arrangement, the marking devices 40 and 40′ are retracted when their solenoids 160 are energized, and are actuated when their solenoids are de-energized. The electrical circuit, therefore, is normally closed, and the actuating switch 224 serves, when it is operated, to open the circuit in which it is connected.

It will be seen that the apparatus and method of the present invention are relatively simple in operation and significantly reduce the time and effort necessary to make accurate orthographic projections of three dimensionally shaped articles, and also to check the dimensions of such articles against drawings to which they are supposed to correspond. The possibility of human error in such work is materially reduced since it is not necessary to transfer measurements by hand or to make trigonometric computations. The points selected on the article are automatically transferred to the drawing surface with a high degree of accuracy and in true orthographic projection. With the preferred apparatus of the invention, both elevational and plan views may be made simultaneously, and the making of these views may conveniently be interrupted at any time for making cross-sectional or longitudinal sectional views without inconvenience. After the sectional views have been completed, the making of the plan and elevational views may then be continued without loss of accuracy and without the necessity for reorienting any of the work.

It should also be pointed out that the use of the apparatus and the method of the invention greatly facilitates proper orientation of the article or model to be drawn in a desirable attitude for drawing. In making working drawings for the manufacture of dies and other like articles, the attitude of the work-piece is often of critical importance, especially where back drafts may be encountered. It is often difficult to determine visually whether or not there are undesirable back drafts, or whether the article is in such an attitude that it cannot readily be formed in a die. With the present invention, the attitude can readily be checked merely by moving the pointer 104 over the article to determine where the back drafts are and whether they would be of trouble in manufacture. The article can then be adjusted until a proper orientation is obtained.

What is claimed is:

1. Apparatus for making orthographic projection drawings comprising a drawing surface, a pair of parallel rails arranged along opposite sides of said surface and parallel thereto, a rigid frame mounted for smoothly guided travel along said rails, a slide member mounted on said frame for smoothly guided travel thereon transversely with respect to said rails and in a plane parallel to said surface, a pointer mounted at one end of said slide member for smoothly guided travel perpendicularly to said surface, a marking device carried by said frame between said rails and movable in the direction of said surface, and coupling means for coupling said marking device to said pointer for travel synchronously with the travel of said pointer in directions perpendicular to said surface.

2. Apparatus for making orthographic projection drawings comprising a pair of parallel rails, a rigid frame mounted for smoothly guided travel along said rails, a slide member mounted on said frame for smoothly guided travel thereon transversely with respect to said rails and in a plane parallel to the plane defined by said rails, a pointer mounted at one end of said slide member for smoothly guided travel perpendicularly to the plane of travel thereof, and a drive shaft carried by said slide member and rotatable with respect thereto, a rack and pinion connecting said shaft with said pointer for rotating said shaft responsively to the travel of said pointer in said perpendicular direction, a marking device carried by said frame and movable with respect thereto in the plane of travel thereof, and gear means for coupling said marking device to said drive shaft for travel in said plane synchronously with the travel of said pointer perpendicularly thereto.

3. Apparatus for making orthographic projection drawings comprising a pair of parallel rails, a rigid frame mounted for smoothly guided travel along said rails, a slide member mounted on said frame for smoothly guided travel thereon transversely with respect to said rails and in a plane parallel to the plane defined by said rails, a pointer mounted at one end of said slide member for smoothly guided travel perpendicularly to the plane of travel thereof, and a drive shaft carried by said slide member and rotatable with respect thereto, a rack and pinion connecting said shaft with said pointer for rotating said shaft responsively to the travel of said pointer in said perpendicular direction, a marking device carried by said frame and movable with respect thereto in the plane of travel thereof, and gear means for coupling said marking device to said drive shaft for travel transversely with respect to said rails synchronously with the travel of said pointer perpendicularly to said plane.

4. Apparatus for making orthographic projection drawings comprising a pair of parallel rails, a rigid frame mounted for smoothly guided travel along said rails, a slide member mounted on said frame for smoothly guided travel thereon transversely with respect to said rails and in a plane parallel to the plane defined by said rails, a pointer mounted at one end of said slide member for smoothly guided travel perpendicularly to the plane of travel thereof, and a drive shaft carried by said slide member and rotatable with respect thereto, a rack and pinion connecting said shaft with said pointer for rotating said shaft responsively to the travel of said pointer in said perpendicular direction, a marking device carried by said frame and movable with respect thereto in the plane of travel thereof, and gear means for coupling said marking device to said drive shaft for travel parallel to said rails synchronously with the travel of said pointer perpendicularly to said plane.

5. Apparatus for making orthographic projection drawings comprising a horizontal drawing surface, a pair of parallel rails mounted along opposite sides of said surface, a rigid frame mounted on said rails for smoothly guided travel thereon above said surface, a slide member mounted on said frame for smoothly guided travel thereon transversely with respect to said rails, the length of said slide member being at least twice as great as the spacing between said rails, a vertical guide member fixed at one end of said slide member, a vertical shaft carried by said frame and vertically and transversely movable with respect thereto, said shaft being received and guided for smooth vertical travel by said guide member, a pointer mounted at the lower end of said shaft for travel therewith and for rotation about the shaft axis, said pointer being movable with said frame, said slide member and said shaft to any point within a preselected space, a marking device associated with said frame and mounted for travel over said surface, means for controllably actuating said marking device to make a mark on said surface, and means for fixing said marking device to said slide member for travel therewith.

6. Apparatus for making orthographic projection drawings comprising a horizontal drawing surface, a pair of parallel rails mounted along opposite sides of said surface, a rigid frame mounted on said rails for smoothly guided travel thereon above said surface, a slide member mounted on said frame for smoothly guided travel thereon transversely with respect to said rails, the length of said slide member being at least twice as great as the spacing between said rails, a vertical guide member fixed at one end of said slide member, a vertical shaft carried by said frame and vertically and transversely movable with respect thereto, said shaft being received and guided for smooth vertical travel by said guide member, a pointer mounted at the lower end of said shaft for travel therewith and for rotation about the shaft axis, said pointer being movable with said frame said slide member and said shaft to any point within a preselected space, a rotatable drive shaft carried by and parallel with said slide member, a rack and pinion connecting said vertical shaft with said drive shaft for synchronizing the rotation of said drive shaft with the vertical travel of said pointer, ways fixed to said frame and extending between said rails, a marking device slidably mounted on said ways and operative controllably to make a mark upon said surface, and rack and pinion means for coupling said marking device to said drive shaft for travel along said ways synchronously with the vertical travel of said pointer.

7. Apparatus for making orthographic projection drawings comprising a horizontal drawing surface, a pair of parallel rails mounted along opposite sides of said surface, a rigid frame mounted on said rails for smoothly guided travel thereon above said surface, a slide member mounted on said frame for smoothly guided travel thereon transversely with respect to said rails, the length of said slide member being at least twice as great as the spacing between said rails, a vertical guide member fixed at one end of said slide member, a vertical shaft carried by said frame and vertically and transversely movable with respect thereto, said shaft being received and guided for smooth vertical travel by said guide member, a pointer mounted at the lower end of said shaft for travel therewith and for rotation about the shaft axis, said pointer being movable with said frame said slide member and said shaft to any point within a preselected space, a rotatable drive shaft carried by and parallel with said slide member, a rack and pinion connecting said vertical shaft with said drive shaft for synchronizing the rotation of said drive shaft with the vertical travel of said pointer, a rack mounted on said slide member transversely with respect thereto, and a pinion fixed for rotation with said drive shaft and in mesh with said rack for driving said rack transversely of said slide member synchronously with the vertical travel of said pointer.

8. Apparatus for making orthographic projection drawings comprising a horizontal drawing surface, a pair of parallel rails mounted along opposite sides of said surface, a rigid frame mounted on said rails for smoothly guided travel thereon above said surface, a slide member mounted on said frame for smoothly guided travel thereon transversely with respect to said rails, the length of said slide member being at least twice as great as the spacing between said rails, a vertical guide member fixed at one end of said slide member, a vertical shaft carried by said frame and vertically and transversely movable with respect thereto, said shaft being received and guided for smooth vertical travel by said guide member, a pointer mounted at the lower end of said shaft for travel therewith and for rotation about the shaft axis, said pointed being movable with said frame said slide member and said shaft to any point within a preselected space, a rotatable drive shaft carried by and parallel with said slide member, a rack and pinion connecting said vertical shaft with said drive shaft for synchronizing the rotation of said drive shaft with the vertical travel of said pointer, ways fixed to said frame and extending between said rails, a first marking device slidably mounted on said ways and operative controllably to make a mark upon said surface, rack and pinion means for coupling said marking device to said drive shaft for travel along said ways synchronously with the vertical travel of said pointer, a rack slidably mounted transversely on said slide member, releasable gear means for releasably coupling said slide member rack to said drive shaft for drive thereby parallel to said rails synchronously with the vertical travel of said pointer, a second marking device fixed to said slide member rack, and a detent arranged to fix said second marking device with respect to said slide member when said releasable gear means are released.

9. Apparatus for making orthographic projection drawings comprising means defining a horizontal drawing surface, a pair of parallel rails mounted along opposite sides of said surface, a rigid frame mounted on said rails for smoothly guided travel thereon above said surface, a slide member mounted on said frame for smoothly guided travel thereon transversely with respect to said rails, the length of said slide member being at least twice as great as the spacing between said rails, a vertical guide member fixed at one end of said slide member, a superstructure rigidly fixed on said frame and including an overhead rail arranged generally parallel to said slide member, a carriage mounted on said overhead rail, a vertical shaft suspended from said carriage and vertically movable with respect thereto, said shaft being received and guided for smooth vertical travel by said guide member, means for synchronizing the travel of said carriage with the travel of said slide member, a pointer mounted at the lower end of said vertical shaft for travel therewith and for rotation about the shaft axis, rack and pinion means for driving said slide member, rack and pinion means for driving said vertical shaft vertically, rack and pinion means for driving said frame along said rails, means for releasably fixing said frame with respect to said rails, means for releasably fixing said slide member with respect to said frame, a marking device positioned between said rails and operative when actuated to make a mark on said surface, and means for selectively coupling said marking device to said frame, said slide member, and said vertical shaft for travel synchronously with a two-dimensional component of the travel of said pointer.

10. Apparatus for making orthographic projection drawings comprising a pointer mounted for translational three-dimensional travel, a drawing surface, a pair of members mounted adjacent to said surface for two-dimensional travel parallel thereto, and coupling means for driving said members in mutually perpendicular directions in response to movement of said pointer perpendicularly to said drawing surface, said coupling means including a rotatable shaft extending generally parallel to said surface, means connecting said shaft to said pointer for rotation in response to movement of said pointer perpendicularly to said surface, and means for connecting said shaft to said members for driving them in response to rotation of said shaft.

References Cited in the file of this patent

UNITED STATES PATENTS

| | | |
|---|---|---|
| 1,746,331 | Aftergut et al. | Feb. 11, 1930 |
| 2,305,167 | Kasper | Dec. 15, 1942 |
| 2,307,501 | Goddu et al. | Jan. 5, 1943 |
| 2,589,923 | Braund | Mar. 18, 1953 |
| 2,744,329 | Way et al. | May 8, 1956 |
| 2,746,152 | Deakin | May 22, 1956 |
| 2,807,878 | Woods | Oct. 1, 1957 |

FOREIGN PATENTS

| | | |
|---|---|---|
| 666,870 | Germany | Oct. 29, 1938 |